No. 716,538. Patented Dec. 23, 1902.
C. M. HARRISON.
STEAM SHOVEL OR EXCAVATING MACHINE.
(Application filed Mar. 27, 1902.)
(No Model.)
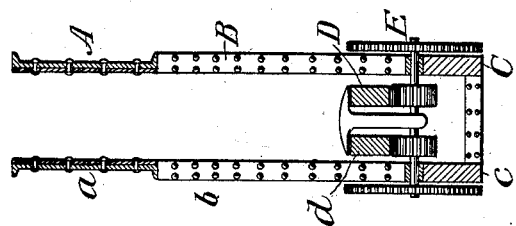
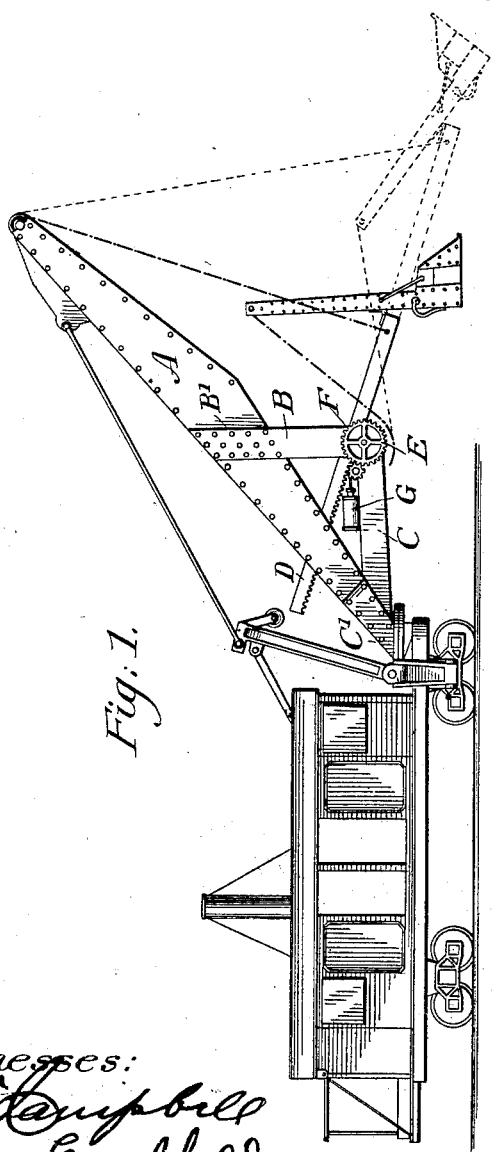
Witnesses:
Inventor
Charles M. Harrison

United States Patent Office.

CHARLES M. HARRISON, OF NAPOLEON, OHIO.

STEAM SHOVEL OR EXCAVATING-MACHINE.

SPECIFICATION forming part of Letters Patent No. 716,538, dated December 23, 1902.

Application filed March 27, 1902. Serial No. 100,350. (No model.)

*To all whom it may concern:*

Be it known that I, CHARLES M. HARRISON, a citizen of the United States, residing at Napoleon, in the county of Henry and State of Ohio, have invented certain new and useful Improvements in Steam Shovels or Excavating-Machines; and I do declare the following to be a full, clear, and exact description of the invention.

My invention relates to an improvement on the main boom of a steam shovel or excavator, and is especially adapted to a steam shovel or excavator with a secondary boom, shovel, and shovel-arm and with pivotal connections between the secondary boom and shovel-arm, as covered by Letters Patent No. 671,925, issued by Patent Office of United States.

The objects of my improvement are, first, to increase the distance of projection and retraction of the secondary boom and shovel when attached to a pivotal main boom; second, to permit the shovel to work at a much lower level; third, to remove the necessity of swinging the engines, boilers, drums, &c., as in said Patent No. 671,925 aforesaid. I attain these objects by a framework illustrated by the accompanying drawings, in which—

Figure 1 is a side elevation, in which A is the main boom as commonly used in steam-shovels. B is a framework descending in a more or less vertical direction from the main boom A until it intersects the frame C, which extends from the pivotal base of the main boom A in a more or less horizontal direction, intersecting the frame B at F, where the conjunction of the two form the bracket B F C. The frames B and C may either form a part of the main boom A or be constructed out of separate material and attached to the main boom A between the lines B' and C' by welding, rivets, bolts, or other means. The frames B and C may be attached in a similar manner at their intersection F. E is a shaft or axle resting upon suitable bearings at or near F and attached to which are the pinions or cogs, which fit into the cogged rack attached to the secondary boom D in the usual way. By means of the crowding-engine or motive power G and cog-gearing as commonly used the secondary boom D is advanced or retracted by rotating the axle E.

Fig. 2 is a front elevation with shovel and shovel-arm detached. A and *a* are the main boom as commonly used in steam shovels or excavators. B and *b* show a front view of the vertical framework of the bracket B F C, while C and *c* show the end view of the transverse sections of the horizontal frames of the bracket B F C. E is the axle or shaft, resting upon suitable bearings at or near F and *f* and upon which are placed the pinions or cogs, which fit into the cogged rack on secondary boom D and *d*, which is projected or retracted by crowding-engines or motive power and gearing as commonly used on steam shovels or excavators. H is a brace between the frames C and *c*.

Having described my invention, what I claim, and desire to secure by Letters Patent, is—

In an excavating apparatus the combination of a main boom having a bracket extending below and forward therefrom, a secondary boom mounted to reciprocate upon an "axle" in said bracket, a shovel pivotally connected with the secondary boom and means for operating shovel and boom.

In testimony whereof I affix my signature in the presence of the two witnesses named below.

CHARLES M. HARRISON.

Witnesses:
W. W. CAMPBELL,
LAURA H. CAMPBELL.